(12) United States Patent
Ishihara et al.

(10) Patent No.: US 7,284,724 B2
(45) Date of Patent: *Oct. 23, 2007

(54) MAGNETIC TAPE CARTRIDGE

(75) Inventors: Yusuke Ishihara, Kanagawa-ken (JP); Daisuke Takahashi, Kanagawa-ken (JP); Hideaki Shiga, Kanagawa-ken (JP); Seiji Tsuyuki, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 15 days.

This patent is subject to a terminal disclaimer.

(21) Appl. No.: 10/751,470

(22) Filed: Jan. 6, 2004

(65) Prior Publication Data

US 2004/0169103 A1  Sep. 2, 2004

Related U.S. Application Data

(63) Continuation of application No. 10/058,034, filed on Jan. 29, 2002, now Pat. No. 6,796,520.

(30) Foreign Application Priority Data

Jan. 30, 2001 (JP) ............................. 2001-020939

(51) Int. Cl.
*G11B 23/107* (2006.01)
(52) U.S. Cl. ................................. 242/348.2; 242/348
(58) Field of Classification Search ................ 242/338, 242/332, 332.4, 347, 347.1, 348, 348.2; 360/132, 360/133
See application file for complete search history.

(56) References Cited

U.S. PATENT DOCUMENTS 4,290,567 A * 9/1981 Saito ........................ 242/343.1
4,635,879 A 1/1987 Sumida et al.
4,852,825 A 8/1989 McGee et al.
5,180,118 A 1/1993 Tanaka et al.
5,588,606 A 12/1996 Kikuchi et al.
5,868,338 A 2/1999 Martin et al.
5,927,633 A 7/1999 McAllister
6,003,802 A 12/1999 Eaton et al.
6,034,850 A 3/2000 Del Genio et al.
6,092,762 A 7/2000 Aaron
6,125,012 A 9/2000 Miyazaki et al.
6,663,036 B1 * 12/2003 Ishihara et al. .......... 242/348.2

FOREIGN PATENT DOCUMENTS

EP  926675 A1  6/1999

* cited by examiner

*Primary Examiner*—William A. Rivera
*Assistant Examiner*—Scott Haugland
(74) *Attorney, Agent, or Firm*—Sughrue Mion Pllc.

(57) ABSTRACT

A magnetic tape cartridge is equipped with a cartridge, a single tape reel, a tape leader pin, and a U-shaped clip. The cartridge case is formed by fastening upper and lower cases of synthetic resin together and has a tape leader opening formed in the upper and lower side walls of the upper and lower cases. The single tape reel has magnetic tape wound thereon and is rotatably housed within the cartridge case. The tape leader pin is firmly attached to a leading end of the magnetic tape, and is detachably held in an upright state between the upper and lower cases so that it faces the tape leader opening. The U-shaped clip is attached to walls near the tape leader opening to fasten the upper and lower cases together, whereby the fastening strength of the upper and lower cases is enhanced.

6 Claims, 8 Drawing Sheets

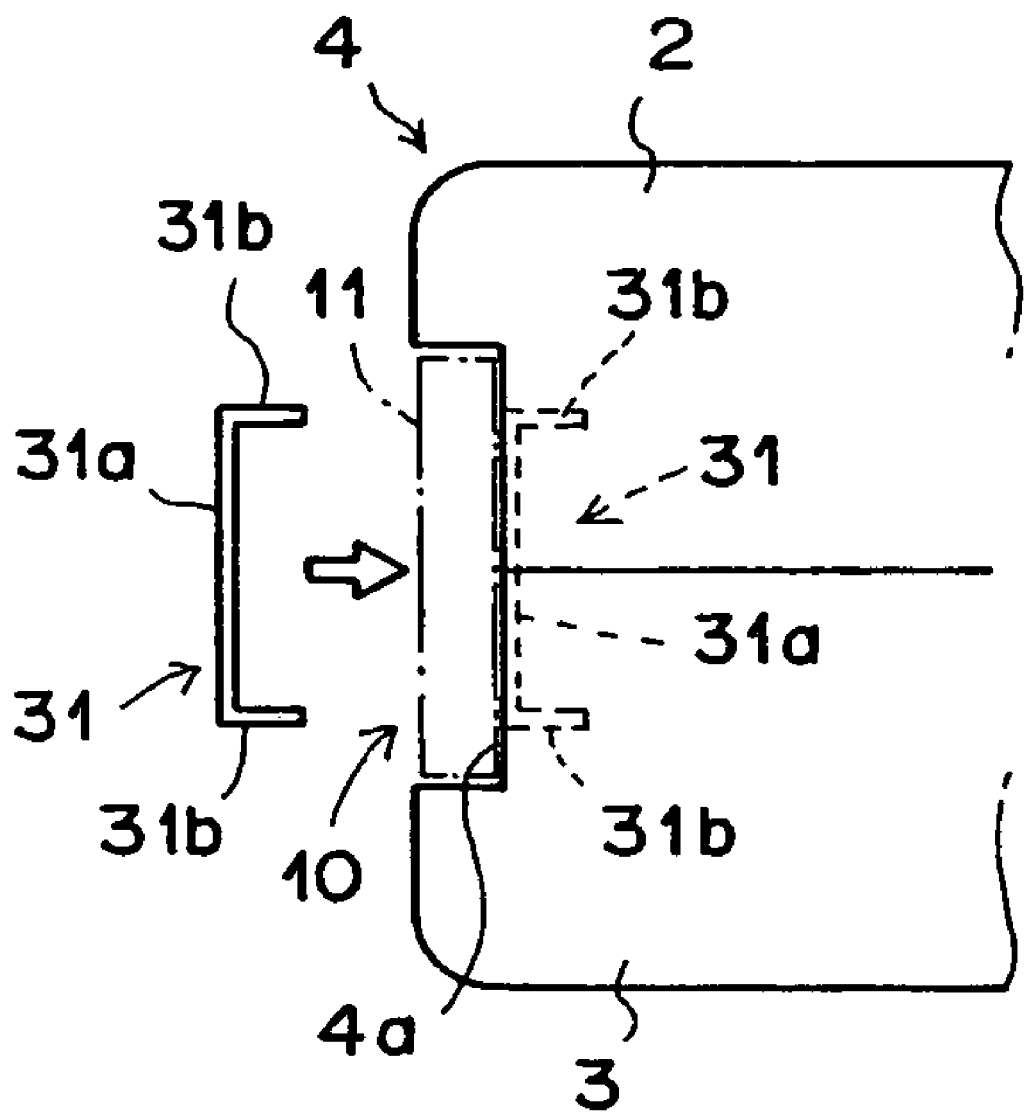

MAGNETIC TAPE CARTRIDGE

This is a continuation of application Ser. No. 10/058,034 filed Jan. 29, 2002; now U.S. Pat. No. 6,796,520 the disclosure of which is incorporated herein by reference.

BACKGROUND OF THE INVENTION

1. Field of the Invention

The present invention relates to a magnetic tape cartridge in which a single tape reel with magnetic tape wound thereon is rotatably housed within a cartridge case, and more particularly to a magnetic tape cartridge, which has a cartridge case equipped with upper and lower cases of synthetic resin fastened together and a tape leader opening formed in the side walls of the upper and lower cases, and in which a tape leader pin firmly attached to the leading end of the magnetic tape is detachably held in an upright state between the upper and lower case so that it faces the tape leader opening.

2. Description of the Related Art

In magnetic tape cartridges, which are being used as storage media that are employed in external storage units for computers, etc., there is known a type where a single tape reel with magnetic tape wound thereon is rotatably housed within a cartridge case. This magnetic tape is employed to archive data for computers, etc. Since important information has been stored, the magnetic tape cartridge is constructed so that problems, such as tape jamming, etc., do not occur and that the magnetic tape is not pulled out of the cartridge case inadvertently.

The magnetic tape has a tape leader pin firmly attached to the leading end thereof. When this magnetic tape cartridge is loaded into a recording-reproducing unit, a leader-pin catching member on the side of the recording-reproducing unit engages the tape leader pin and pulls out the magnetic tape from the cartridge case. On the other hand, when the magnetic tape cartridge is unloaded from the recording-reproducing unit, the magnetic tape is rewound on the tape reel and the tape leader pin is returned into the cartridge case by the leader-pin catching member. The cartridge case is formed by fasten in upper and lower cases of synthetic resin together with a plurality of small screws, and has a tape leader opening, which is formed in the side walls of the upper and lower cases. The tape leader pin is detachably held at the upper and lower ends thereof by a leader-pin holding spring so that it faces the tape leader opening.

The above-mentioned tape leader pin is illustrated in FIG. 1. This tape leader pin 5 is constructed of a pin main body P of, for example, metal and a tape clamp member 5e of synthetic resin. The pin main body P consists of a tape clamp portion 5a formed between a pair of inner flanges 5b, 5b, small-diameter shaft portions 5c, 5c respectively formed outside the inner flanges 5b, 5b, and outer flanges 5d, 5d respectively formed outside the small-diameter shaft portions 5c, 5c. In addition, the tape clamp portion 5e has a C-shaped cross section and is elastically fitted onto the outer periphery of the tape clamp portion 5a of the pin main body P, whereby the leading end portion of the magnetic tape 6 is clamped between the tape clamp member 5e and the tape clamp portion 5a.

In the magnetic tape cartridge, on the other hand, the magnetic tape 6 is completely wound on the tape reel during non-use of the cartridge, and the upper and lower flanges 5d, 5d of the tape leader pin 5 are housed in upper and lower leader-pin housing recesses formed near the tape leader opening and are locked and held by the aforementioned leader-pin holding spring that elastically abuts the upper and lower flanges 5d, 5d. In this manner, the tape leader pin 5 is locked and held in an upright state. If the magnetic tape cartridge is loaded into a recording-reproducing unit that uses this magnetic tape cartridge, the upper and lower small-diameter shaft portions 5c, 5c of the tape leader pin 5 are caught by a leader-pin catching member provided in the cartridge drive mechanism of the recording-reproducing unit, and the magnetic tape 6 is introduced into a tape traveling path formed within the recording-reproducing unit.

As stated above, the upper and lower cases constituting the cartridge case of the magnetic tape cartridge are usually fastened together by four small screws. In the case where the upper and lower cases are fastened together by small screws, the shank portion of each small screw requires a thickness of some magnitude or greater to form threads therein. Furthermore, for these small screws, one of the upper and lower cases requires boss portions each having a through bore, while the other requires boss portions each having a threaded bore. Because of this, space for these boss portions has to be assured.

Near the leader-pin holding portion, however, there is no space to provide boss portions which are used for fastening small screws, in order to avoid interference with the leader-pin catching member of the recording-reproducing unit and assure a tape traveling path for magnetic tape. Because of this, and also because of the presence of the tape leader opening, the force fastening the upper and lower cases together is weaker near the leader-pin holding portion than at other parts.

Therefore, when a strong shock is exerted on the cartridge case by its being dropped, etc., or in the case when a force that opens the upper and lower cases is exerted near the tape leader opening, there is a problem that (1) the upper and lower cases in that portion will be moved away from each other, (2) the tape leader pin being held between the upper and lower cases will fall out of the leader-pin holding portion of the cartridge case and will be tilted, and (3) the catching of the tape leader pin by the leader-pin catching member of the drive mechanism of the recording-reproducing unit will become impossible.

To prevent the falling of the tape leader pin due to such a strong shock, the joining surfaces of the upper and lower cases of the cartridge case can be welded over the entire circumference. However, welding the joining surfaces of the upper and lower cases is undesirable with regard to disassembly, because there is a need to disassemble the cartridge case and take out the magnetic tape with important information along with the tape reel and then put them into a new cartridge case, in the event of an unforeseen accident, or after long-term use.

Furthermore, because the force fastening the upper and lower cases is weaker near the leader-pin holding portion than other parts, there is another problem that the tape leader pin being held between the upper and lower cases will fall out of the leader-pin holding portion by the moment of inertia of the tape leader pin, when shock is exerted on the cartridge case by its being dropped, etc.

SUMMARY OF THE INVENTION

The present invention has been made in view of the circumstances mentioned above. Accordingly, it is the primary object of the present invention to provide a magnetic tape cartridge that is capable of preventing the falling of the tape leader pin due to shock produced by its being dropped, etc.

To achieve this end, there is provided a first magnetic tape cartridge, which comprises a cartridge case, formed by fastening upper and lower cases of synthetic resin together, and having a tape leader opening formed in upper and lower side walls of the upper and lower cases; a single tape reel having magnetic tape wound thereon and rotatably housed within the cartridge case; a tape leader pin, firmly attached to a leading end of the magnetic tape, and detachably held in an upright state between the upper and lower cases so that it faces the tape leader opening; and a U-shaped clip attached to walls near the tape leader opening to fasten the upper and lower cases together.

In the first magnetic tape cartridge of the present invention, it is preferable that the aforementioned U-shaped clip be formed from a rustproof metal.

The first magnetic tape cartridge of the present invention may further comprise a slide door, provided on a side wall of the cartridge case, and urged in a closing direction by a spring member so that it is slidable along the side wall to open or close the tape leader opening. In this case, it is preferable that the aforementioned clip be covered by the slide door when the slide door is closed.

The first magnetic tape cartridge of the present invention may further comprise a leader-pin holding spring attached to the cartridge case near the tape leader opening. In this case, the aforementioned tape leader pin has axially opposite flanges and is detachably held by the leader-pin holding spring that elastically abuts the axially opposite flanges in a horizontal direction.

According to the first magnetic tape cartridge of the present invention, the aforementioned U-shaped clip is attached to walls near the tape leader opening to fasten the upper and lower cases together. This clip is capable of firmly fastening the upper and lower cases together as a clamp. Thus, for instance, when a strong shock is exerted on the cartridge case by its being dropped, etc., the tape leader pin being held between the upper and lower cases can be prevented from falling out of the leader-pin holding portion of the cartridge case. In addition, when there develops a need to disassemble the cartridge case, it can be easily disassembled by detaching the small screws and removing the U-shaped clip from the upper and lower cases. Furthermore, the U-shaped clip is covered with the slide door when the slide door is closed. Thus, there is no possibility that user's eye will fall on the clip, and there is no fear that the clip will mar the external appearance of the magnetic tape cartridge.

Incidentally, the width of the tape clamp portion of the pin main body of the tape leader pin, formed between a pair of inner flanges of the pin main body, is standardized according to the width of magnetic tape, and the axial width of the small-diameter shaft portions formed outside the inner flanges is also determined by the leader-pin catching member of a cartridge drive unit. Thus, it is impossible to shorten both the length of the tape clamp portion and the axial width of the small-diameter shaft portions.

Hence, a second magnetic cartridge of the present invention is characterized in that the upper and lower cases near the tape leader opening are thickened by making the outer flanges of the tape leader pin thin.

In the second magnetic tape cartridge, in addition to the thickening of the upper and lower cases near the tape leader opening, it is preferable that a U-shaped clip be attached to walls near the tape leader opening to fasten the upper and lower cases together.

With this construction, the second magnetic tape cartridge of the present invention is capable of easy disassembly and also enhances the strength of the upper and lower cases near the tape leader opening. Thus, for example, when a strong shock is exerted on the cartridge case by its being dropped, etc., the tape leader pin being held between the upper and lower cases can be prevented from falling out of the leader-pin holding portion of the cartridge case.

The strength of the upper and lower cases near the tape leader opening can be further improved by attaching the U-shaped clip on the walls of the tape leader opening portion for fastening the upper and lower cases in addition to the thickening of the upper and lower cases.

A third magnetic tape cartridge of the present invention is characterized in that metal reinforcement members are embedded in the upper and lower cases near the tape leader opening by insert molding.

In the third magnetic tape cartridge, in addition to the metal-reinforcement members, it is preferable that a U-shaped clip be attached to walls near the tape leader opening to fasten the upper and lower cases together.

According to the third magnetic tape cartridge of the present invention, the aforementioned metal reinforcement members are embedded in the upper and lower cases near the tape leader opening by insert molding. With this construction, the third magnetic tape cartridge is capable of easy disassembly and also enhances the strength of the upper and lower cases near the tape leader opening. Thus, for example, when a strong shock is exerted on the cartridge case by its being dropped, etc., the tape leader pin being held between the upper and lower cases can be prevented from falling out of the leader-pin holding portion of the cartridge case.

Furthermore, in addition to the metal reinforcement members, the U-shaped clip is attached to walls near the tape leader opening to fasten the upper and lower cases together. Thus, the strength of the upper and lower cases near the tape leader opening can be further enhanced.

A fourth magnetic tape cartridge of the present invention is characterized in that the tape leader pin is formed from a material of low specific gravity. The material of low specific gravity used herein refers to a light metal alloy, such as an aluminum alloy with a specific gravity of about 2.7 $g/cm^3$, a magnesium alloy with a specific gravity of about 1.8 $g/cm^3$, etc., or synthetic resin. Foam resin, particularly lightweight among resins, can be employed.

In the fourth magnetic tape cartridge, when the tape leader pin has both a pin main body with a tape clamp portion, and a clamp member with a C-shaped cross-section that is elastically fitted onto the tape clamp portion, the pin main body is formed from a light metal alloy or synthetic resin and the clamp member is formed from synthetic resin.

According to the fourth magnetic tape cartridge, the tape leader pin is formed from a material of low specific gravity. Thus, even when a strong shock is exerted on the cartridge case by its being dropped, etc., the fear of the tape leader pin falling out of the leader-pin holding portion of the cartridge case is reduced because the moment of inertia of the tape leader pin is small.

BRIEF DESCRIPTION OF THE DRAWINGS

The present invention will be described in further detail with reference to the accompanying drawings wherein:

FIG. 6 is a side view showing the vicinity of the tape leader opening of the cartridge case shown in FIG. 2;

DESCRIPTION OF THE PREFERRED EMBODIMENTS

A first embodiment of the present invention will hereinafter be described with reference to FIGS. 2 to 6. Note that the fore-and-aft direction in the following description corresponds to a direction (direction diagonal to the upper right of FIG. 2 or right direction in FIGS. 3 and 4) in which a magnetic tape cartridge is loaded into a recording-reproducing unit.

Figure 1:
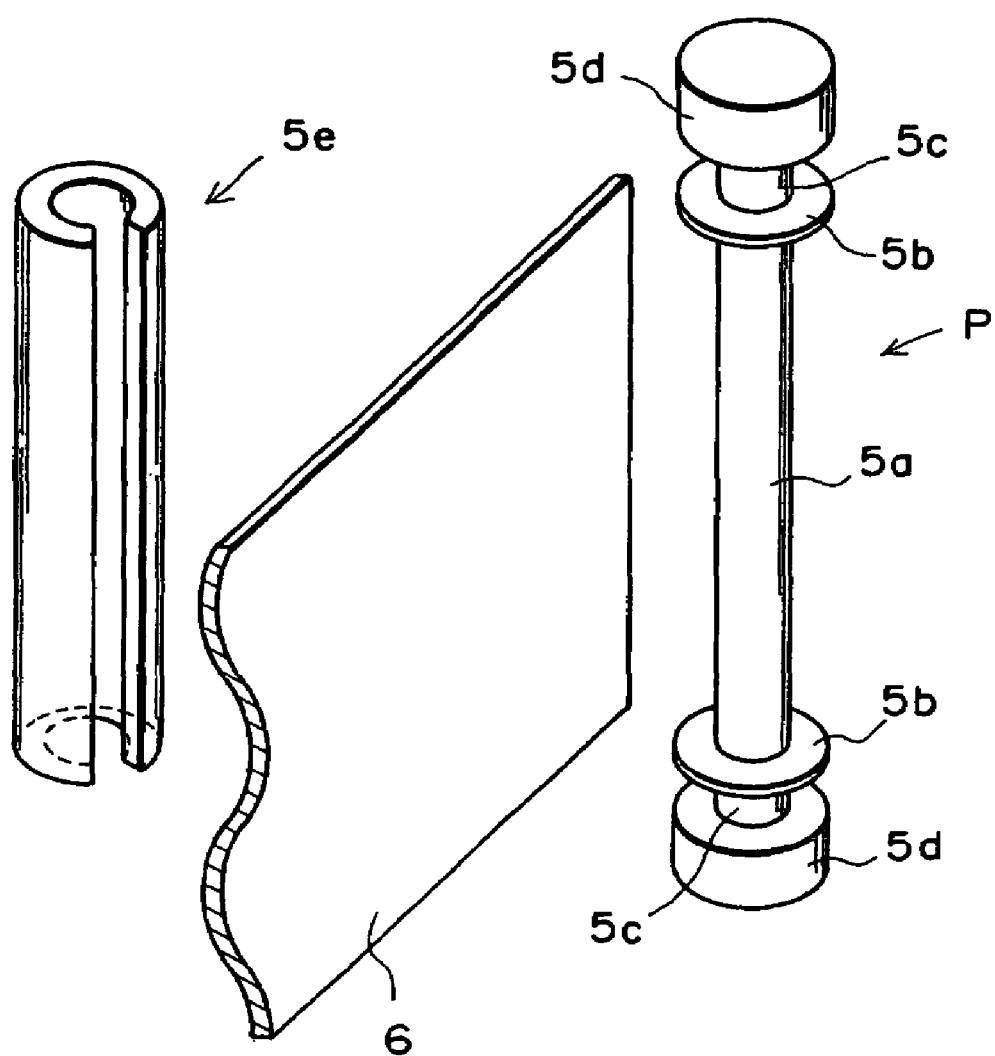
FIG. 1 is an exploded perspective view of the tape leader pin provided in a conventional magnetic tape cartridge.
Figure 2:
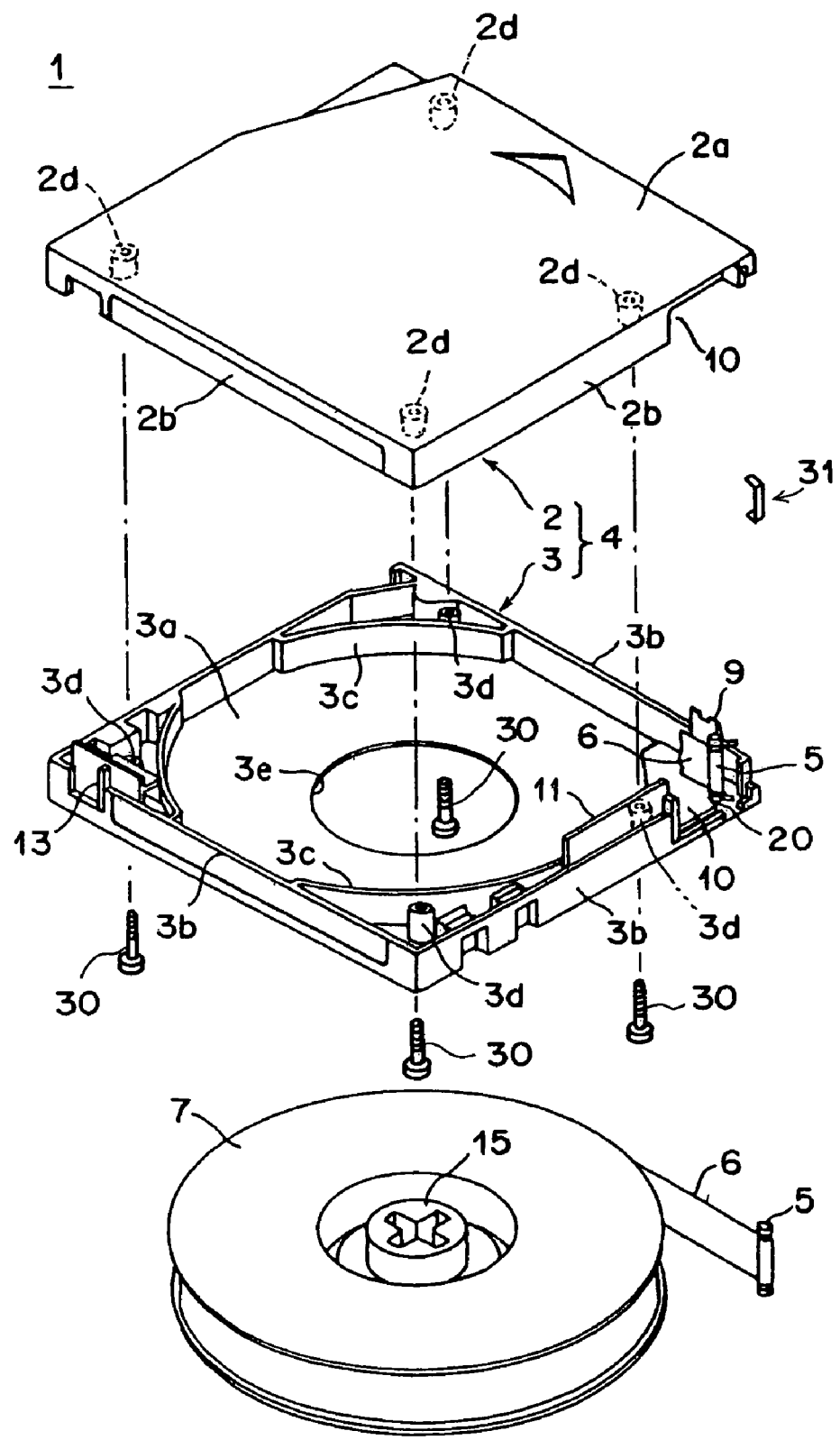
FIG. 2 is an exploded perspective view showing a magnetic tape cartridge constructed according to a first embodiment of the present invention.

In FIG. 2, the magnetic tape cartridge 1 has a cartridge case 4, which is formed by fastening an upper case 2 and a lower case 3 together with four small screws 30. A tape leader pin 5 is firmly attached to the leading end of magnetic tape 6, and a single tape reel 7 with the magnetic tape 6 wound thereon is rotatably housed with in the cartridge case 4. The upper and lower cases 2, 3 are substantially rectangular in shape, and are provided with top and bottom walls 2b, 3b, and upper and lower side walls 2a, 3a along the perimeters of the top and bottom walls 2b, 3b. The upper and lower cases 2, 3 are further provided with arcuate inside walls 3c (not shown for the upper case 2) extending along the outer periphery of the tape reel 7. The four boss portions 3d of the lower case 3, each disposed between the side wall 3b and the inside wall 3c, are aligned vertically with the four boss portions 2d of the upper case 2, and the upper and lower cases 2, 3 are fastened together by the small screws 30 inserted through the bottom surface of the lower case 3.

The lower case 3 has a center aperture 3e at the central portion thereof so that the tape reel 7 is rotated by the driving shaft of a cartridge drive unit (not shown) The cartridge case 4 has a write inhibit member 13 at the rear end portion thereof, the write inhibit member 13 being disposed so that it is slidable. The central portion of the tape reel 7 is provided with a locking mechanism 15 for restricting rotation of the tape reel 7 when not being used.

Although not shown, the tape reel 7 has a magnet type reel plate mounted on the central portion of the bottom surface thereof. The reel plate is used to attract and hold the rotation drive means of the cartridge drive unit. The radially outer portion of the bottom wall of the tape reel 7 is provided with a reel gear (not shown) which meshes with the driving gear of the rotation drive means. Note that if the reel gear and the driving gear mesh with each other, the locking mechanism 15 is unlocked so that the tape reel 7 is free to rotate.

The side walls 2b, 3b of the upper and lower cases 2, 3 are provided with a tape leader opening 10 through which the tape leader pin 5 of the magnetic tape 6 is pulled in and out of the cartridge case 4. The tape leader opening 10 is opened or closed by a slide door 11 urged in a closing direction by a spring (not shown). Near the tape leader opening 10, there is formed a grooved door rail 12 (see FIG. 4) along which the slide door 11 slides.

Figure 3:
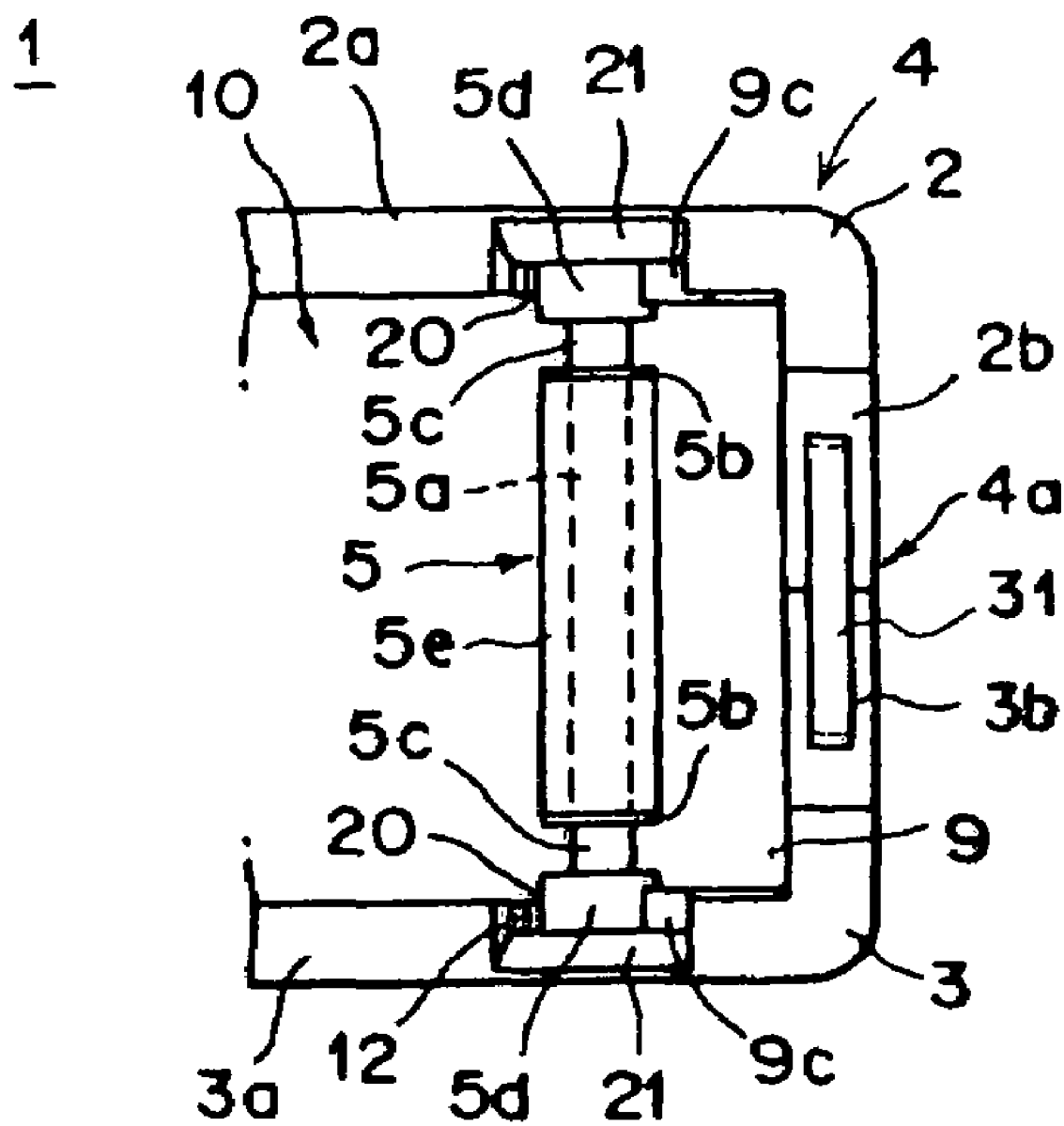
FIG. 3 is a front view of the vicinity of the tape leader opening shown in FIG. 2, a slide door being open to show the tape leader opening.
Figure 4:
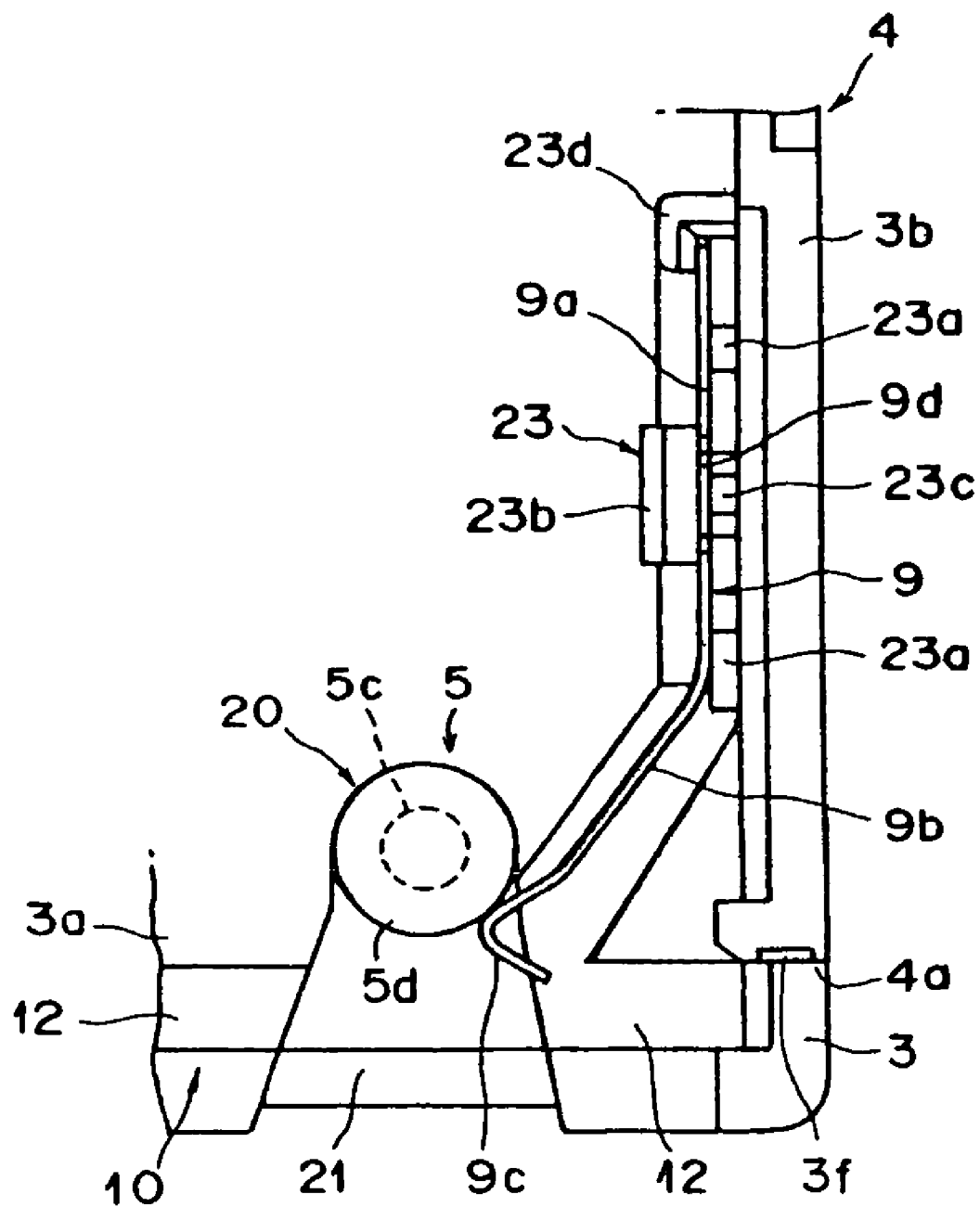
FIG. 4 is a plan view of the vicinity of the tape leader opening shown in FIG. 3, an upper case being removed to show how a tape leader pin is held by a leader-pin holding spring.

In the magnetic tape cartridge 1, as shown in FIGS. 3 and 4, the tape leader pin 5 is locked and held in upper and lower leader-pin housing recesses 20, 20 formed near the tape leader opening 10, with the magnetic tape 6 completely wound on the tape reel 7 during non-use of the cartridge 1. The upper and lower leader-pin housing recesses 20, 20 are continuous to upper and lower insertion-guide portions 21, 21 (which consist of inclined guide surfaces) formed into a lead-in structure toward the tape leader opening 10. That is, the upper and lower insertion-guide portions 21, 21 are constructed so that the upper and lower end portions of the tape leader pin 5 can be guided to the upper and lower leader-pin housing recesses 20, 20 towards the interior.

Figure 5:
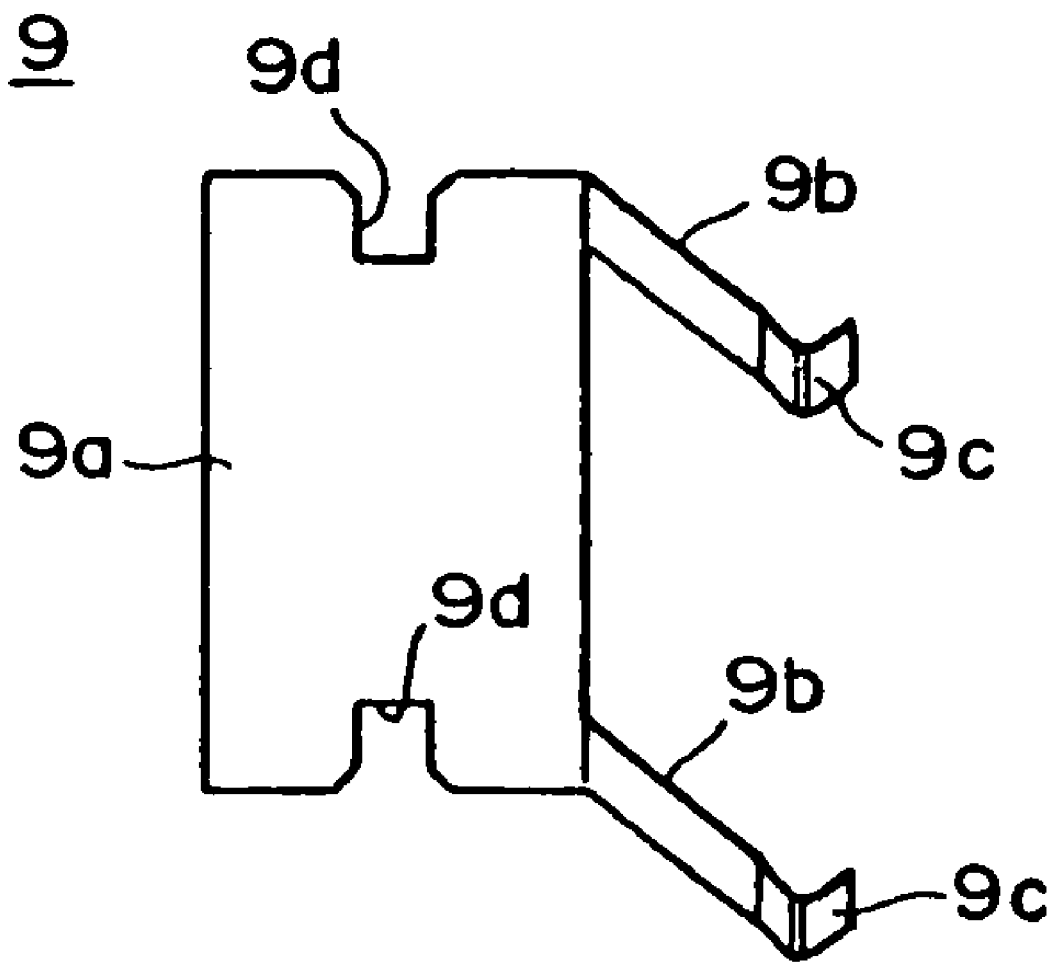
FIG. 5 is a perspective view of the leader-pin holding spring shown in FIG. 4.

The upper and lower cases 2, 3 are provided with a leader-pin holding spring 9, which consists of a plate spring such as that shown in FIG. 5, to detachably hold the upper and lower end portions of the tape leader pin 5 in the upper and lower leader-pin housing recesses 20, 20. The leader-pin holding spring 9 is integral up and down and has a mounting portion 9a in the form of a generally rectangular plate. With the upper case 2 and the lower case 3 stacked with each other, the mounting portion 9a is engaged and held by upper and lower spring installing portions 23 provided near the case side walls (front walls) 2b, 3b, as shown in FIG. 4. Although not shown, the upper case 2 is symmetrical in shape with the lower case 3. The leader-pin holding spring 9 also has a pair of elastic arm portions 9b, 9b extending obliquely from the upper and lower end portions of the mounting portion 9a toward the tape leader pin 5. The elastic arm portions 9b, 9b have leader-pin holding portions 9c, 9c at their outer ends, respectively. The leader-pin holding portions 9c, 9c elastically abut the outer peripheries of the upper and lower flanges 5d, 5d of the tape leader pin 5. As shown in FIG. 4, each leader-pin holding portion 9c is bent so that it projects toward the tape leader pin 5. The bent portion of the leader-pin holding portion 9c consists of an outer inclined surface and an inner inclined surface. If the tape leader pin 5 is inserted through the tape leader opening 10, the upper and lower flanges 5d, 5d of the tape leader pin 5 are brought into contact with the outer inclined surfaces of the bent portions of the upper and lower leader-pin holding portions 9c, and the upper and lower elastic arm portions 9b, 9b are elastically deformed. As a result, the upper and lower flanges 5d, 5d of the tape leader pin 5 are held within the upper and lower leader-pin housing recesses 20, 20 by the inner inclined surfaces of the bent portions of the upper and lower lead-pin holding portions 9c of the leader-pin holding spring 9. In addition, the top and bottom edges of the mounting portion 9a are provided with engagement recesses 9d, 9d, respectively.

The lower spring installing portion 23 of the lower case 3, for holding the leader-pin holding spring 9, is equipped with two ribs 23a and 23a formed on the interior surface of the side or front wall 3b of the lower case 3; a first protrusion 23b erected in the top surface of the lower case 3; and a second protrusion 23c formed between the two ribs 23a and 23a. Similarly, the upper spring installing portion (not shown) of the upper case 2 is equipped with two ribs (not shown), a first protrusion (not shown), and a second protrusion (not shown). If the upper and lower portions of the mounting portion 9a of the leader-pin holding spring 9 are inserted between the upper ribs and the upper first protrusion and between the lower ribs 23a and the lower first protrusion 23b, the upper and low second protrusions 23c are fitted into the upper and lower engagement recesses 9d, 9d of the mounting portion 9a of the leader-pin holding spring 9. In this manner, the leader-pin holding spring 9 is held by the upper and lower spring installing portions 23. Furthermore, the spring installing portions 23 are provided with tilt regulating portions 23d, which are used to hold the edge, opposite to the elastic arm portions 9b, of the mounting portion 9a of the leader-pin holding spring 9 in an upright state.

In the first embodiment, in addition to fastening the upper and lower cases 2, 3 together by the four small screws 30, a clip 31 consisting of a rustproof metal is attached to walls near the tape leader opening 10 to fasten the upper and lower cases 2, 3 together, as shown in FIG. 6. This clip 31 has a connecting plate portion 31a, and a pair of leg portions 31b, 31b bent at substantially right angles in the same direction at both ends of the connecting plate portion 31a, and is formed into a U-shape. One of the two leg portions 31b, 31b is driven into the wall of the upper case 2, while the other is driven into the wall of the lower case 3. Thus, the clip 31 functions as a clamp that firmly fastens the upper and lower cases 2, 3. In the first embodiment, the clip 31 is attached to the upper and lower side walls 2b, 3b of the cartridge case 4 through a cutout 4a, formed so that the front end of the slide door 11 faces the front surface of the cartridge case 4. The upper and lower side walls 2, 3b are provided with shallow grooves (only the groove 3f of the lower case 3 is shown in FIG. 4) in which the connecting plate portion 31a of the clip 31 is fitted so that it does not contact with the back surface of the slide door 11. Note that the position at which the clip 31 is attached is not limited to the position shown in FIG. 4, but may be a different position if it is on a wall near the tape leader opening 10.

As described above, a wall portion near the leader-pin holding portion has no space for providing boss portions, so it is difficult to fasten the upper and lower cases 2, 3 together at that wall portion by use of the small screws 30. However, in the first embodiment, it is possible to fasten the upper and lower cases 2, 3 near the leader-pin holding portion, by employing the U-shaped clip 31 as a clamp. Thus, even when a strong shock is exerted on the cartridge case 4 by its being dropped, etc., the lightweight, elongate tape leader pin 5 being held between the upper and lower cases 2, 3 can be prevented from falling out of the leader-pin holding portion.

As described above, the U-shaped clip 31 is attached to the side walls 2b, 3b of the cartridge case 4 through the cutout 4a, formed so that the front end face of the slide door 11 faces the front surface of the cartridge case 4. Thus, when the slide door 11 is closed, the clip 31 is covered with the slide door 11. Therefore, there is no possibility that user's eye will fall on the clip 31, and there is no fear that the clip 31 will mar the external appearance of the magnetic tape cartridge 1. In addition, when there develops a need to disassemble the cartridge case 4, it can be easily disassembled by detaching the small screws 30 and removing the clip 31 from the upper and lower cases 2, 3.

Figure 7A:
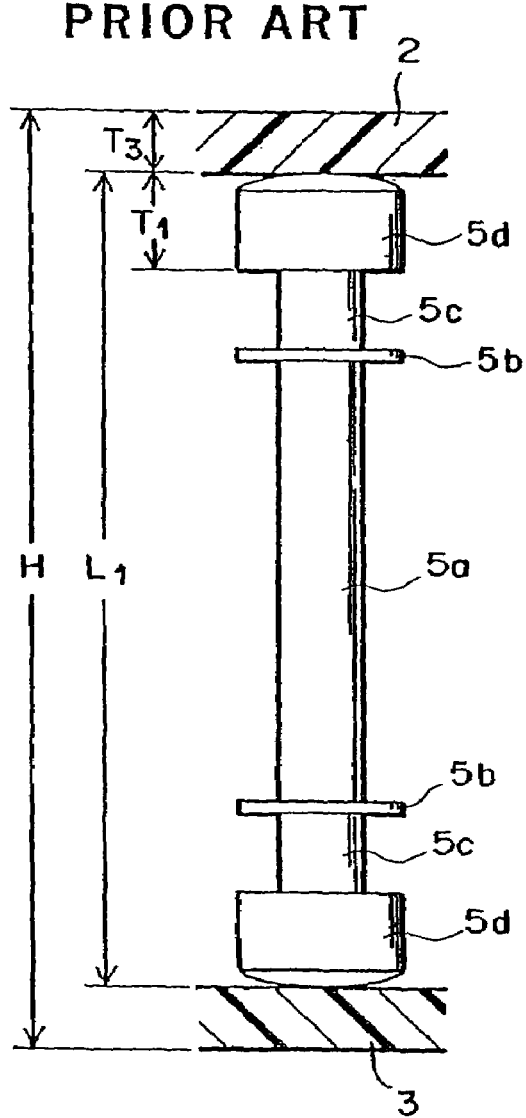
FIG. 7A is an explanatory diagram showing the dimensional relationship between the upper and lower cases and the pin main body, near the tape leader opening, of the conventional magnetic tape cartridge.
Figure 7B:
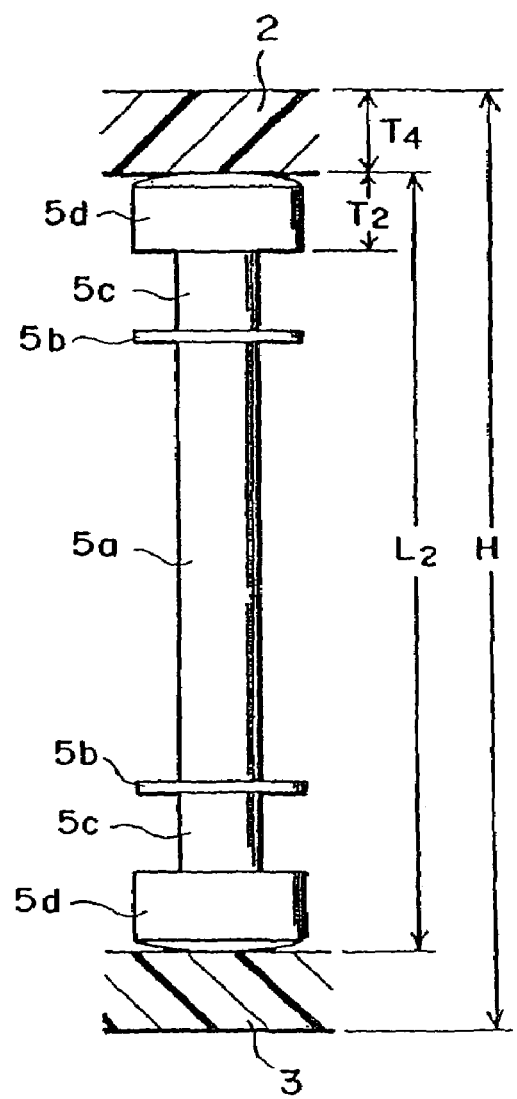
FIG. 7B is an explanatory diagram showing the dimensional relationship between the upper and lower cases and the pin main body of a magnetic tape cartridge constructed according to a second embodiment of the present invention.

FIG. 7 illustrates a second embodiment of the present invention. The dimensional relationship between the upper and lower cases and the pin main body, near the tape leader opening, of a conventional magnetic tape cartridge is shown in FIG. 7A, while the dimensional relationship between the upper and lower cases and the pin main body of the second embodiment is shown in FIG. 7B. For magnetic tape with a width of 14 mm, the height H (21.5 mm) of a cartridge case 4 consisting of upper and lower cases 2, 3, the width of a tape clamp portion 5a, the width of an inner flange 5b, and the width of a small-diameter shaft portion 5c are the same between the conventional tape cartridge and the tape cartridge of the second embodiment.

In the conventional pin main body shown in FIG. 7A, the thickness $T_1$ of the outer flange 5d is 1.48 mm and the length $L_1$ of the pin main body 19.46 mm. In the second embodiment shown in FIG. 7B, the thickness $T_2$ of the outer flange 5d is reduced (1.1 mm) and the length $L_2$ of the pin main body is made short (18.7 mm). Therefore, in the conventional cartridge case 4, the thickness $T_3$ of the part, opposite to the top of the upper flange 5d (or the bottom of the lower flange 5d), of the upper case 2 (or lower case 3) is 1.0 mm, while the thickness $T_4$ of the same part in the second embodiment can be increased to 1.38 mm (about 38%). Note that the thickness $T_2$ of the flange 5d in the second embodiment is set at a value that does not reduce the leader-pin holding function of the leader-pin holding spring 9.

In the second embodiment, as evident in the foregoing description, the outer flanges 5d, 5d of the pin main body of the tape leader pin 5 are made thin, whereby the tape leader pin 5 is shortened and the upper and lower cases 2, 3 near the tape leader opening 10 are thickened. In this manner, the second embodiment is capable of easily disassembling the cartridge case 4 and also enhances the strength of the upper and lower cases 2, 3 near the tape leader opening 10. Therefore, for example, when a strong shock is exerted on the cartridge case 4 by its being dropped, etc., the tape leader pin 5 being held between the upper and lower cases 2, 3 can be prevented from falling out of the leader-pin holding portion of the cartridge case 4. In addition to the thickening of the upper and lower cases 2, 3, if the U-shaped clip 31 for fastening the upper and lower cases 2, 3 is attached to walls near the tape leader opening 10, whereby the strength of the upper and lower cases 2, 3 near the tape leader opening 10 can be further enhanced.

Figure 8:
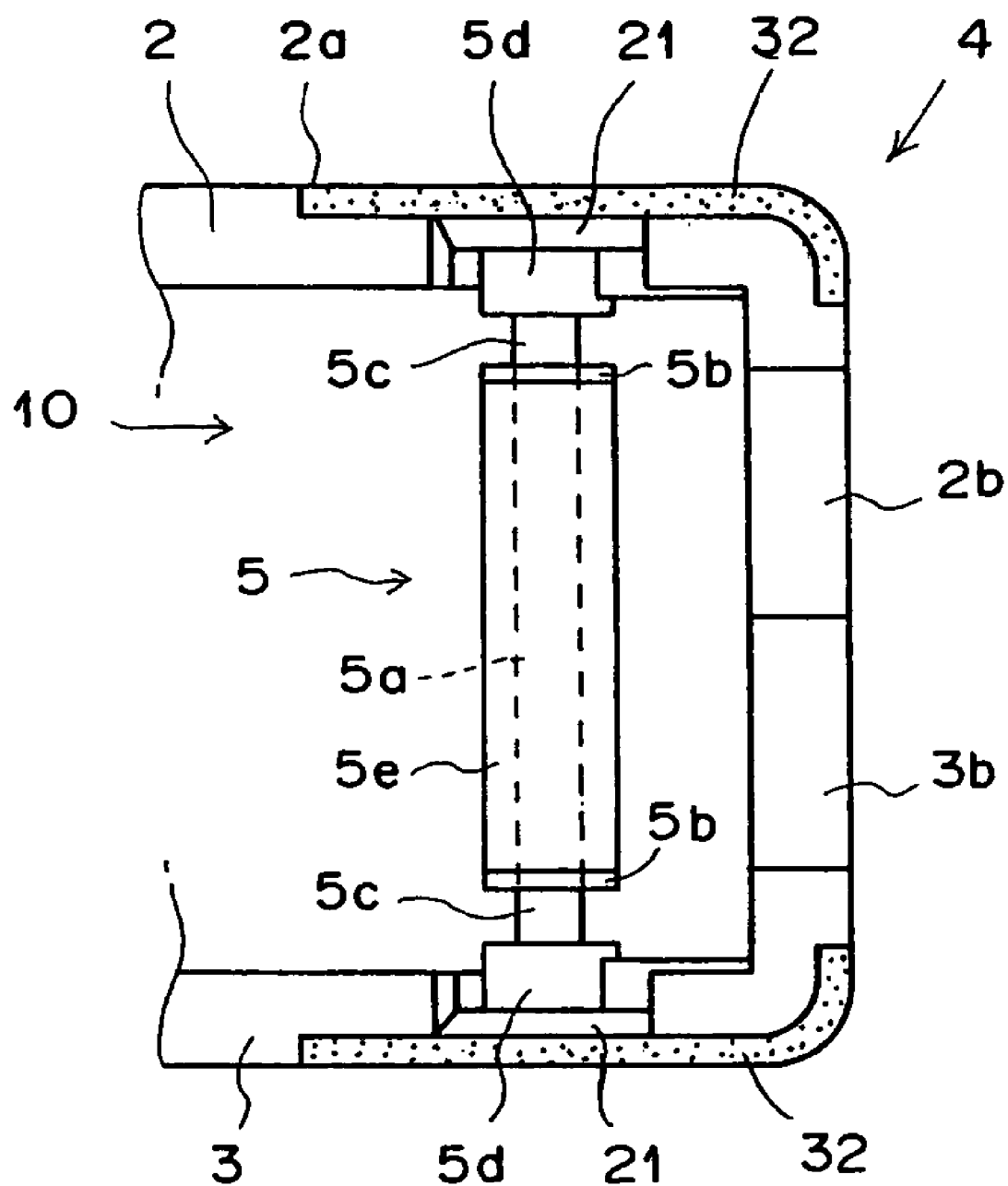
FIG. 8 is a front view showing the vicinity of the tape leader opening of a magnetic tape cartridge constructed according to a third embodiment of the present invention.

FIG. 8 illustrates a third embodiment of the present invention. In the third embodiment, reinforcement members 32, 32 in the form of metal plates are embedded in the upper and lower cases 2, 3 near the tape leader opening 10 so that they are opposed to each other and also cover the surfaces of the upper and lower cases 2, 3. The metal reinforcement members 32, 32 are provided by insert molding when the upper and lower cases 2, 3 are molded.

In the third embodiment, the metal reinforcement members 32, 32 are embedded in the upper and lower cases 2, 3 near the tape leader opening 10 by insert molding, whereby the cartridge case 4 can be easily disassembled and also the strength of the upper and lower cases 2, 3 near the tape leader opening 10 can be enhanced. Therefore, for example, when a strong shock is exerted on the cartridge case 4 by its being dropped, etc., the tape leader pin 5 being held between the upper and lower cases 2, 3 can be prevented from falling out of the leader-pin holding portion of the cartridge case 4. In addition, the strength of the upper and lower cases 2, 3 near the tape leader opening 10 can be further enhanced by embedding the metal reinforcement members 32, 32 by insert molding, and also by attaching the clip 31 to walls near the tape leader opening 10 to fasten the upper and lower cases 2, 3 together.

In the first through the third embodiments mentioned above, the aforementioned object of the present invention is achieved by strengthening the vicinity of the tape leader opening 10 of the cartridge case 4. In a fourth embodiment of the present invention to be described below, the object of the present invention is achieved by reducing the weight of the tape leader pin 5.

Since the pin main body of the conventional tape leader pin 5 is generally formed from a metal of relatively high specific gravity such as stainless steel (e.g., the specific gravity of iron is about 7.8 g/cm$^3$), the moment of inertia of the tape leader pin 5 itself is great. Because of this, when shock is exerted on the cartridge case 4, there is a fear that the tape leader pin 5 will fall out of the leader-pin holding portion by the moment of inertia thereof. However, in the fourth embodiment, the pin main body of the tape leader pin 5 is formed from a metal of relative low specific gravity such as an aluminum alloy with a specific gravity of 2.7 g/cm$^3$, and the clamp member 5e is formed from a resin of low specific gravity (e.g., the specific gravity of polycarbonate resin is 1.22 g/cm$^3$). In this manner, the moment of inertia of the tape leader pin 5 is reduced. Therefore, even when shock is exerted on the cartridge case 4, the fear of the tape leader pin 5 falling out of the leader-pin holding portion is reduced because the moment of inertia of the tape leader pin 5 is small. In addition, a zinc alloy with a specific gravity of about 6.7 g/cm$^3$ is only about 15% lighter in weight than iron with a specific gravity of 7.8 g/cm$^3$, but considering the productivity due to the extremely short die-cast molding cycle, it can be safely stated that the zinc alloy is a desirable material.

While the present invention has been described with reference to the preferred embodiments thereof, the invention is not to be limited to the details given herein, but may be modified within the scope of the invention hereinafter claimed.

The invention claimed is:

1. A magnetic tape cartridge comprising:
    a cartridge case, formed by fastening upper and lower cases of synthetic resin together, and having a tape leader opening formed in upper and lower side walls of said upper and said lower cases;
    a single tape reel having magnetic tape wound thereon and rotatably housed within said cartridge case; and
    a tape leader pin, firmly attached to a leading end of said magnetic tape, and detachably held in an upright state between said upper and lower cases so that said tape leader pin faces said tape leader opening;
    wherein said tape leader pin has axially opposite flanges;
    wherein a length of said tape leader pin is 18.7 mm;
    wherein the cartridge case has a thickness of 1.38 mm above and below the axially opposite flanges of the tape leader pin and
    further comprising a U-shaped clip attached to walls near said tape leader opening to fasten said upper and said lower cases together,
    wherein the U-shaped clip includes a connecting plate portion and a pair of leg portions bent at right angles in the same direction at both ends of the connecting plate portion such that the pair of leg portions, which form the right angles relative to the connecting plate portion, are respectively inserted into the upper and lower sidewalls perpendicular to the tape leader pin detachably held in the upright state.

2. The magnetic tape cartridge as set forth in claim 1, further comprising a leader-pin holding spring attached to said cartridge case near said tape leader opening, said leader-pin holding spring comprising a mounting portion that includes a rectangular plate and a pair of elastic arm portions, in which top and bottom edges of the mounting portion are provided with engagement recesses, respectively;
    wherein said tape leader pin is detachably held by said leader-pin holding spring that elastically abuts said axially opposite flanges in a horizontal direction.

3. A magnetic tape cartridge comprising:
    a cartridge case, formed by fastening upper and lower cases of synthetic resin together, and having a tape leader opening formed in upper and lower side walls of said upper and said lower cases;
    a single tape reel having magnetic tape wound thereon and rotatably housed within said cartridge case; and
    a tape leader pin, firmly attached to a leading end of said magnetic tape, and detachably held in an upright state between said upper and lower cases so that said tape leader pin faces said tape leader opening;
    wherein metal reinforcement members are embedded in the upper and lower cases, respectively, near said tape leader opening, in which a first metal reinforcement member is provided above said tape leader pin and a second metal reinforcement member is provided below said tape leader pin such that said first metal reinforcement member and said second reinforcement member embedded in the upper and lower cases are respectively disposed at least over a first flange of the tape leader pin and below a second flange of the tape leader pin, which is axially opposed to the first flange, when the tape leader pin is detachably held in the upright state between said upper and lower cases; and
    further comprising a U-shaped clip attached to walls near said tape leader opening to fasten said upper and said lower cases together.

4. The magnetic tape cartridge as set forth in claim 3, further comprising a leader-pin holding spring attached to said cartridge case near said tape leader opening;
    wherein said tape leader pin is detachably held by said leader-pin holding spring that elastically abuts said axially opposite flanges in a horizontal direction.

5. The magnetic tape cartridge as set forth in claim 3, wherein the U-shaped clip includes a connecting plate portion and a pair of leg portions bent at right angles in the same direction at both ends of the connecting plate portion such that the pair of leg portions, which form the right angles relative to the connecting plate portion, are respectively inserted into the upper and lower sidewalls perpendicular to the tape leader pin detachably held in the upright state.

6. The magnetic tape cartridge as set forth in claim 1, wherein a thickness of each of said axially opposite flanges is 1.1 mm.

* * * * *